US 6,628,374 B2

(12) United States Patent
Shirai et al.

(10) Patent No.: US 6,628,374 B2
(45) Date of Patent: Sep. 30, 2003

(54) DISTANCE MEASUREMENT APPARATUS

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/137,386

(22) Filed: May 3, 2002

(65) Prior Publication Data

US 2002/0167654 A1 Nov. 14, 2002

(30) Foreign Application Priority Data

May 14, 2001 (JP) ........................................ 2001-143164

(51) Int. Cl.[7] ............................. G01C 3/08; G01S 13/08
(52) U.S. Cl. ................... 356/5.01; 356/5.05; 356/4.01; 342/135
(58) Field of Search ...................... 356/4.01, 5.01–5.15; 342/128, 134, 135, 145

(56) References Cited

U.S. PATENT DOCUMENTS

| | | | | |
|---|---|---|---|---|
| 5,003,553 A | * | 3/1991 | Schluge et al. ............. | 375/130 |
| 5,115,242 A | * | 5/1992 | Nagamune et al. ......... | 342/124 |
| 5,329,467 A | * | 7/1994 | Nagamune et al. ......... | 702/159 |
| 5,757,848 A | * | 5/1998 | Hogberg ..................... | 375/150 |
| 6,031,601 A | * | 2/2000 | McCusker et al. ......... | 356/5.01 |
| 6,218,982 B1 | | 4/2001 | Shirai et al. | |

FOREIGN PATENT DOCUMENTS

| | | |
|---|---|---|
| JP | 60-102015 | 6/1985 |
| JP | 7-321611 | 12/1995 |

OTHER PUBLICATIONS

U.S.S.N. 09/429,164 filed on Oct. 28, 1999.

* cited by examiner

Primary Examiner—Thomas H. Tarcza
Assistant Examiner—Brian Andrea
(74) Attorney, Agent, or Firm—Posz & Bethards, PLC

(57) ABSTRACT

A code generating device operates for generating a pseudo random noise code having a sequence of a predetermined number of chips each being in one of first and second logic states different from one another. A code monitoring device operates for detecting at least a preset number of successive chips in the first logic state in the pseudo random noise, and for changing at least one among the detected preset number of successive chips to the second logic state to convert the pseudo random noise code into a transmission signal. A driving device operates for activating and deactivating an electromagnetic wave generating device in response to the transmission signal. A receiving device operates for receiving an echo wave caused by reflection of an electromagnetic wave generated by the electromagnetic wave generating device at an object. A distance to the object is detected on the basis of the received echo wave.

6 Claims, 5 Drawing Sheets

DISTANCE MEASUREMENT APPARATUS

BACKGROUND OF THE INVENTION

1. Field of the Invention

This invention relates to a distance measurement apparatus using an electromagnetic wave modulated in accordance with a pseudo random noise code.

2. Description of the Related Art

A prior-art distance measurement apparatus of a spread spectrum type which is mounted on an automotive vehicle measures the distance between the present vehicle and a preceding target object such as a preceding vehicle by using an electromagnetic wave modulated in accordance with a pseudo random noise code (a PN code). Specifically, a beam of an electromagnetic wave whose amplitude is modulated in accordance with a PN code of a predetermined bit length (a predetermined chip length) is emitted in a forward direction with respect to the body of the present vehicle. A moment of the transmission of the PN code with the electromagnetic wave is memorized. The prior-art apparatus receives an echo beam caused by reflection of the forward electromagnetic-wave beam at a preceding target object. The received echo beam is converted into a corresponding electric signal. The echo-beam-corresponding electric signal is binarized into a bi-level echo electric signal. Calculation is made about the value of the correlation between the bi-level echo electric signal and the PN code used for the modulation of the transmitted electromagnetic wave. A moment at which the calculated correlation value peaks is detected as a moment of the reception of the PN code contained in the echo beam. The prior-art apparatus calculates the distance between the present vehicle and the preceding target object from the time interval between the moment of the transmission of the PN code and the moment of the reception thereof, and also from the velocity of the electromagnetic wave.

An example of the electromagnetic wave is light emitted from a laser diode. In general, the life of a laser diode is inversely proportional to the second power to the fourth power of the total time for which the laser diode is active.

Successive bits (chips) of "1" and successive bits of "0" in the PN code cause the PN-code frequency spectrum to extend into a low-frequency side. Such a spectrum extension into a low-frequency side tends to fluctuate the echo-beam-corresponding electric signal at a low frequency. The low-frequency fluctuation reduces the accuracy of binarizing the echo-beam-corresponding electric signal into the bi-level echo electric signal, and also the accuracy of the calculated correlation between the bi-level echo electric signal and the PN code used for the modulation of the transmitted electromagnetic wave.

U.S. Pat. No. 6,218,982 B1 discloses a distance measurement apparatus in which a pseudo random noise code is generated synchronously with a reference clock signal. A first forward electromagnetic wave is transmitted in response to the pseudo random noise code. A first echo wave is received which is caused by reflection of the first forward electromagnetic wave at an object. The received first echo wave is converted into a binary signal. A value of a correlation between the binary signal and the pseudo random noise code is repetitively calculated at a predetermined period having a synchronous relation with the reference clock signal. A time interval taken by the first forward electromagnetic wave and the first echo wave to travel to and from the object is measured in response to a timing at which the calculated correlation value peaks. Then, a second forward electromagnetic wave is transmitted in response to a transmitted pulse signal. A second echo wave related to the second forward electromagnetic wave is received. The received second echo wave is converted into a received pulse signal. A delay circuit defers the transmitted pulse signal by a delay time corresponding to the measured time interval to generate a delayed transmitted pulse signal. A phase difference between the received pulse signal and the delayed transmitted pulse signal is measured at a resolution higher than a resolution corresponding to the predetermined period of the correlation-value calculation. A distance to the object is calculated on the basis of the measured time interval and the measured phase difference.

U.S. patent application Ser. No. 09/429,164, filed on Oct. 28, 1999, relates to a distance measurement apparatus which includes a transmitting device for transmitting a forward electromagnetic wave. A receiving device operates for receiving an echo wave caused by reflection of the forward electromagnetic wave at an object, and converting the received echo wave into a first received signal. A scattered-wave detecting device operates for detecting a scattered wave reaching the receiving device and caused by reflection of the forward electromagnetic wave at an obstacle which occurs prior to the reflection of the forward electromagnetic wave at the object. A cancel-signal generating device operates for generating a cancel signal to cancel a scattered-wave-corresponding component of the first received signal generated by the receiving device in response to the scattered wave detected by the scattered-wave detecting device. A scattered-wave canceling device operates for removing the scattered-wave-corresponding component from the first received signal in response to the cancel signal generated by the cancel-signal generating device to change the first received signal to a second received signal. A distance calculating device responsive to the second received signal operates for measuring a time interval between a moment of the transmission of the forward electromagnetic wave by the transmitting device and a moment of the reception of the echo wave by the receiving device, and calculating a distance to the object on the basis of the measured time interval.

Japanese patent application publication number 60-102015 discloses first and second apparatuses each for generating a pseudo random noise code (a PN code). The first apparatus in Japanese application 60-102015 includes a feedback circuit having an n-stage shift register and half adders. The n-stage shift register and the half adders are connected in a closed loop. The half adders are assigned respectively to selected ones among the stages of the n-stage shift register. The first half adder executes half addition between the output signal from the final stage of the n-stage shift register and the output signal from the assigned stage of the n-stage shift register which precedes the final stage thereof. Each of the second and later half adders executes half addition between the output signal from the immediately-preceding half adder and the output signal from the assigned stage of the n-stage shift register. The output signal from the final half adder is inputted into the first stage of the n-stage shift register. An (m+1)-stage shift register is connected to the output terminal of the n-stage shift register. The (m+1)-stage shift register is composed of D flip-flops connected in cascade. An AND circuit executes AND operation among the output signals from the D flip-flops. The output signal from the AND circuit is applied to a first input terminal of an OR circuit. A reset signal is applied to a second input terminal of the OR circuit. The reset signal is also fed to the stages of the n-stage shift register. The output terminal of the OR circuit is connected with the reset terminals of the D flip-flops. The n-stage shift register and the (m+1)-stage shift register are driven by a common clock signal. The output signal from the first stage of the (m+1)-stage shift register is used as an output PN code. When all the output signals from the stages of the (m+1)-stage shift register become "1", the AND circuit resets the D flip-flops to states corresponding to "0". Accordingly, in the output PN code, a bit (a chip) immediately following "m" successive bits (chips) of "1" is always set to "0". In other words, "m" successive bits of "1" may occur while (m+1) successive bits of "1" are inhibited from occurring. The first D flip-flop acts an inverter for changing a bit of "1" to a bit of "0".

The second apparatus in Japanese application 60-102015 is improved over the first apparatus therein. The second apparatus in Japanese application 60-102015 detects not only when all the output signals from the stages of the (m+1)-stage shift register become "1" but also when all the output signals from the stages of the (m+1)-stage shift register become "0". The detection of successive bits (chips) of "1" or "0" is used to implement the following operation steps. In the output PN code, a bit immediately following "m" successive bits of "1" is always set to "0". On the other hand, a bit immediately following "m" successive bits of "0" is always set to "1". Thus, in the output PN code, the number of successive bits of "1" and also the number of successive bits of "0" are limited to "m" or less.

Japanese patent application publication number 7-321611 discloses a PN code generation circuit including a counter, a ROM, a code length detector, and a switch. The ROM is divided into segments which store different n-bit (n-chip) PN code signals respectively. Here, "n" denotes a predetermined number indicating a PN code length. In each of the ROM segments, "n" bits (chips) composing the related PN code signal are located at different addresses respectively. The counter counts every pulse of a clock signal, and outputs a signal representing the counted pulse number. The code length detector responds to the output signal from the counter. Specifically, the code length detector outputs a reset signal to the counter when the counted pulse number represented by the output signal from the counter reaches the PN code length number "n". The output signal from the counter is fed to the ROM segments as an address signal. Accordingly, the ROM segments output the PN code signals respectively. The switch which follows the ROM segments selects one among the PN code signals as a final PN code signal.

SUMMARY OF THE INVENTION

It is an object of this invention to provide an improved distance measurement apparatus using an electromagnetic wave modulated in accordance with a pseudo random noise code.

A first aspect of this invention provides a distance measurement apparatus comprising electromagnetic wave generating means for generating and transmitting an electromagnetic wave; code generating means for generating a pseudo random noise code having a sequence of a predetermined number of chips each being in one of first and second logic states different from one another; code monitoring means for detecting at least a preset number of successive chips in the first logic state in the pseudo random noise code generated by the code generating means, and for changing at least one among the detected preset number of successive chips to the second logic state to convert the pseudo random noise code into a transmission signal; driving means for activating and deactivating the electromagnetic wave generating means to modulate the electromagnetic wave in response to the transmission signal generated by the code monitoring means; receiving means for receiving an echo wave caused by reflection of the electromagnetic wave generated by the electromagnetic wave generating means and modulated by the driving means at an object, and for converting the received echo wave into a received signal; correlation calculating means for calculating a correlation between the received signal generated by the receiving means and the transmission signal used by the driving means; and distance calculating means for detecting a moment at which the correlation calculated by the correlation calculating means peaks, and for calculating a distance to the object from the detected moment.

A second aspect of this invention is based on the first aspect thereof, and provides a distance measurement apparatus wherein the electromagnetic wave generating means includes a light emitting element, and the driving means activates the light emitting element to allow generation of light when the transmission signal assumes a logic state corresponding to the first logic state, and deactivates the light emitting element to inhibit generation of the light when the transmission signal assumes a logic state corresponding to the second logic state.

A third aspect of this invention is based on the first aspect thereof, and provides a distance measurement apparatus wherein the driving means activates the electromagnetic wave generating means to allow generation of the electromagnetic wave when the transmission signal assumes a logic state corresponding to the first logic state, and deactivates the electromagnetic wave generating means to inhibit generation of the electromagnetic wave when the transmission signal assumes a logic state corresponding to the second logic state.

A fourth aspect of this invention is based on the first aspect thereof, and provides a distance measurement apparatus wherein the code monitoring means comprises means for detecting at least a given number of successive chips in the second logic state in the pseudo random noise code generated by the code generating means, and for changing at least one among the detected given number of successive chips to the first logic state to convert the pseudo random noise code into the transmission signal.

A fifth aspect of this invention provides a distance measurement apparatus comprising first means for generating a first pseudo random noise code having a sequence of chips each being in one of first and second logic states different from one another; second means for detecting a preset number of successive chips in the first logic state in the first pseudo random noise code generated by the first means, and for changing last one among the detected preset number of successive chips to the second logic state to convert the first pseudo random noise code into a second pseudo random noise code; and third means for emitting an electromagnetic wave in response to the second pseudo random noise code generated by the second means.

A sixth aspect of this invention provides a distance measurement apparatus comprising first means for generating a first pseudo random noise code having a sequence of chips each being in one of first and second logic states different from one another; second means for detecting a preset number of successive chips in the first logic state in the first pseudo random noise code generated by the first means, and for changing last one among the detected preset number of successive chips to the second logic state to convert the first pseudo random noise code into a second pseudo random noise code; third means for detecting a given number of successive chips in the second logic state in the second pseudo random noise code generated by the second means, and for changing last one among the detected given number of successive chips to the first logic state to convert the second pseudo random noise code into a third pseudo random noise code; and fourth means for emitting an electromagnetic wave in response to the third pseudo random noise code generated by the third means.

DETAILED DESCRIPTION OF THE INVENTION

First Embodiment

Figure 1:
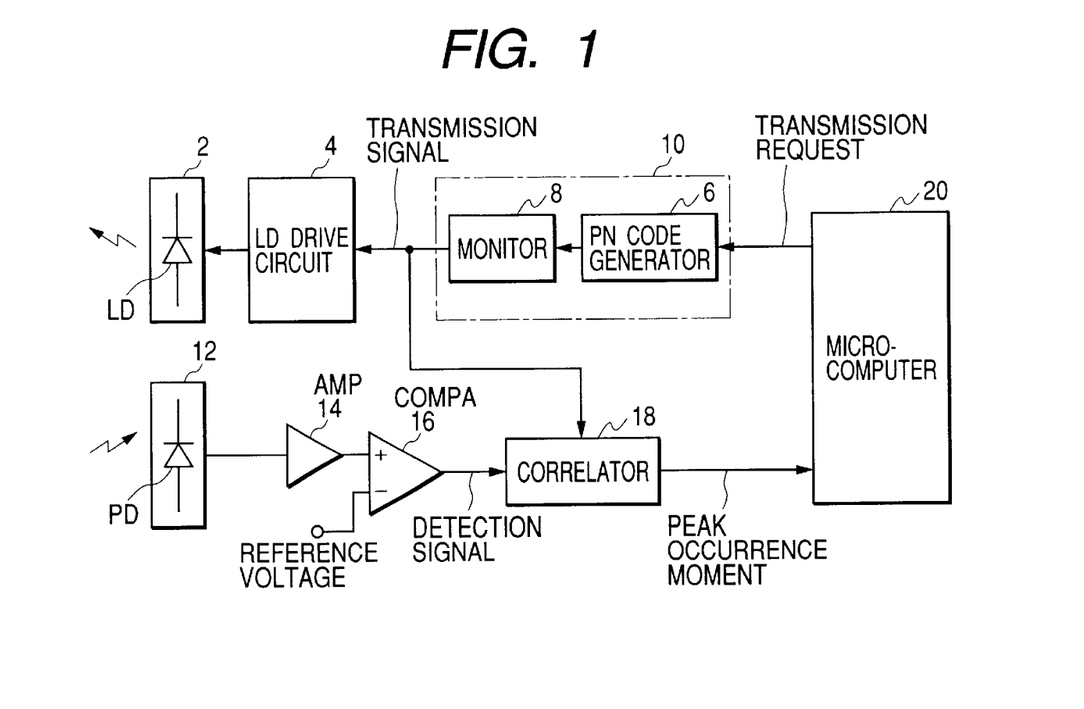
FIG. 1 is a block diagram of a distance measurement apparatus according to a first embodiment of this invention.

FIG. 1 shows a distance measurement apparatus according to a first embodiment of this invention. The apparatus of FIG. 1 is mounted on a vehicle (a subject vehicle). The apparatus of FIG. 1 measures the distance to an object from the subject vehicle. The object is, for example, an obstacle to the subject vehicle or a vehicle traveling ahead of the subject vehicle.

The apparatus of FIG. 1 includes a light emitting portion 2 which functions as an electromagnetic wave generating means. The light emitting portion 2 has a light emitting element using a laser diode LD. The laser diode LD can emit a forward laser beam as seen from the subject vehicle. A laser-diode drive circuit 4 selectively activates and deactivates the laser diode LD, thereby selectively allowing and inhibiting the emission (generation) of the forward laser beam therefrom.

The laser-diode drive circuit 4 receives a transmission signal from a transmission-signal generating portion 10. The transmission signal is of a binary form or a bi-level form, and has a train of pulses. The transmission signal is synchronous with an operation clock signal CK having a predetermined period. The laser-diode drive circuit 4 activates and deactivates the laser diode LD in response to the transmission signal so that the laser diode LD emits pulse laser light. Specifically, when the transmission signal is in its high-level state (its logic state of "1"), the laser-diode drive circuit 4 activates the laser diode LD and hence the laser diode LD emits laser light. When the transmission signal is in its low-level state (its logic state of "0"), the laser-diode drive circuit 4 deactivates the laser diode LD so that the laser diode LD does not emit laser light. Accordingly, the forward laser beam emitted from the laser diode LD has a pulse train which results from amplitude modulation (intensity modulation) in accordance with the pulse train in the transmission signal.

The transmission-signal generating portion 10 includes a PN code generator 6 and a monitor 8. The PN code generator 6 produces and outputs a pseudo random noise code (a pseudo-noise code or a PN code) when receiving a signal representative of a transmission request from a microcomputer 20. The produced PN code is composed of a sequence of a predetermined number of chips (bits). The monitor 8 receives the PN code from the PN code generator 6. The monitor 8 generates the transmission signal in response to the PN code while monitoring the PN code. The monitor 8 outputs the transmission signal to the laser-diode drive circuit 4.

The apparatus of FIG. 1 includes a light receiving portion 12 which functions as an electromagnetic wave receiving means. The light receiving portion 12 has a light receiving element using a photodiode PD. The photodiode PD is connected via a current detection resistor to a power feed line in a reverse bias state. The light receiving portion 12 is successively followed by an amplifier 14 and a comparator 16.

In the case where an object exists in a specified forward area as seen from the subject vehicle, the forward laser beam encounters the object before being at least partially reflected thereby. A portion of the reflected laser beam returns to the apparatus of FIG. 1 as an echo laser beam. Specifically, the echo laser beam is incident to the photodiode PD. The photodiode PD and the other part of the light receiving portion 12 convert the echo laser beam into a corresponding electric signal (an echo signal). The light receiving portion 12 outputs the electric signal to the amplifier 14. The device 14 amplifies the output signal of the light receiving portion 12. The amplifier 14 outputs the amplification-resultant signal to the comparator 16. The device 16 compares the output signal of the amplifier 14 with a predetermined reference voltage (a predetermined threshold voltage), thereby converting the output signal of the amplifier 14 into a binary detection signal or a bi-level detection signal. The binary detection signal is in its high-level state when the voltage of the output signal of the amplifier 14 exceeds the predetermined reference voltage. Otherwise, the binary detection signal is in its low-level state.

A correlator 18 receives the binary detection signal from the comparator 16. The correlator 18 receives the transmission signal from the monitor 8 in the transmission-signal generating portion 10. The correlator 18 includes a register or a memory which stores the transmission signal. The correlator 18 uses the stored transmission signal as a reference code. The correlator 18 calculates a correlation between the binary detection signal and the reference code. The correlator 18 detects a moment at which the calculated correlation peaks. The detected moment is used as a moment at which the light receiving portion 12 (the photodiode PD) receives an echo laser beam caused by reflection of a forward laser beam at an object. The detected moment is also referred to as the correlation-peak-occurrence moment. The correlator 18 outputs a signal representative of the correlation-peak-occurrence moment to the microcomputer 20.

The microcomputer 20 includes a combination of an input/output circuit, a CPU, a ROM, and a RAM. The microcomputer 20 operates in accordance with a program stored in the ROM. The program is designed to enable the microcomputer 20 to execute operation steps mentioned later.

The microcomputer 20 holds information representing the transmission-request-occurrence moment at which the transmission-request signal is outputted to the PN code generator 6 in the transmission-signal generating portion 10. The device 20 computes, from the transmission-request-occurrence moment and the correlation-peak-occurrence moment, the time interval between the moment of the transmission of a forward laser beam by the light emitting portion 2 and the moment of the reception of a corresponding echo laser beam by the light receiving portion 12. The microcomputer 20 calculates, from the computed time interval, the distance between the subject vehicle and an object reflecting the forward laser beam and causing the echo laser beam.

The PN code generator 6 in the transmission-signal generating portion 10 outputs the PN code to the monitor 8 in synchronism with the operation clock signal CK when receiving the transmission-request signal from the microcomputer 20. The PN code outputted from the PN code generator 6 has a sequence of a predetermined number of chips (bits) each corresponding to one period of the operation clock signal CK. The PN code is a 31-chip maximum length code having a waveform such as shown in FIG. 2.

The monitor 8 in the transmission-signal generating portion 10 monitors the state of the PN code. The monitor 8 passes the PN code, which is outside specified conditions, to the laser-diode drive circuit 4 as the transmission signal without changing the PN code. The specified conditions correspond to the occurrence of at least four successive chips (bits) of "1" (a high level) in the PN code. The monitor 8 detects at least four successive chips of "1" in the PN code. As shown in FIG. 2, the monitor 8 inverts last one among four successive chips of "1" in the PN code to "0" (a low level). The monitor 8 outputs the inversion-resultant PN code to the laser-diode drive circuit 4 as the transmission signal. As understood from the previous description, the monitor 8 limits the number of successive chips (bits) of "1" in the transmission signal to three or less.

Figure 2:
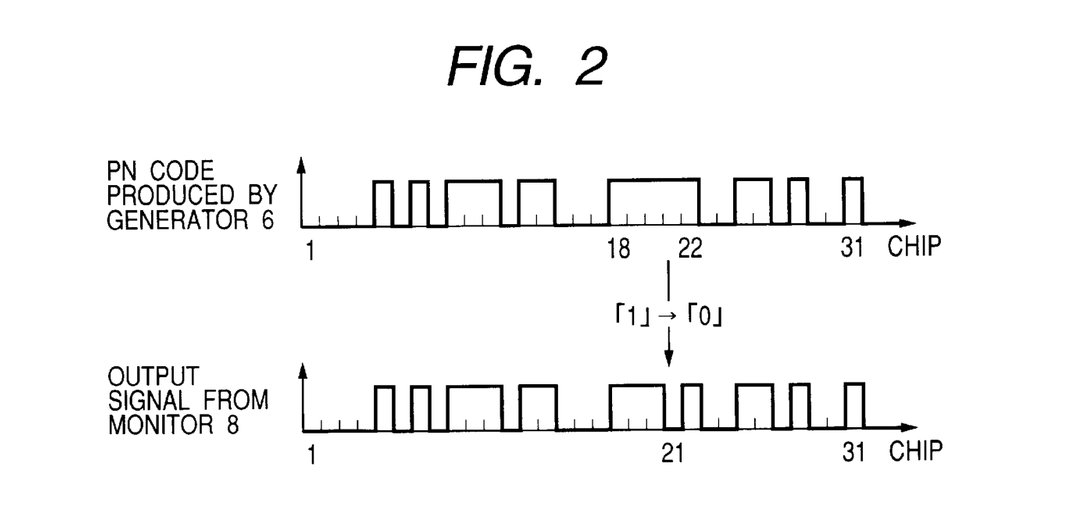
FIG. 2 is a diagram of an example of the states of chips composing an output signal of a PN code generator in FIG. 1, and an example of the states of chips composing an output signal of a monitor in FIG. 1.

In FIG. 2, the 18th chip to the 22nd chip in the PN code are "1". The 21st chip in the PN code is inverted to "0" by the monitor 8. Thus, in the transmission signal outputted from the monitor 8, the 18th chip to the 20th chip are "1" and the 21st chip is "0", and the 22nd chip is "1".

The duration or temporal width of every chip in the transmission signal is equal to one period of the operation clock signal CK. Since the number of successive chips of "1" in the transmission signal is limited to three or less by the monitor 8, the time interval for which the laser diode LD is continuously activated is limited to three periods of the operation clock signal CK or shorter. The limitation on the continuous laser-diode activation time interval causes a longer life of the laser diode LD.

As previously mentioned, the number of successive chips of "1" in the transmission signal is limited to three or less. The limitation on the number of successive chips of "1" suppresses extension of the frequency spectrum of the transmission signal, that is, the frequency spectrum of the echo signal outputted from the light receiving portion 12, into a lower frequency side. Therefore, a low-frequency fluctuation in the echo signal is also suppressed, and hence the echo signal is more accurately converted into the binary detection signal by the comparator 16.

As previously mentioned, the monitor 8 inverts last one among four successive chips of "1" in the PN code to "0". This operation of the monitor 8 is chosen for two reasons as follows. The first reason is that the maximum number of successive chips of "1" in a 31-chip PN code is equal to five. The second reason is that the anti-noise effect provided by use of a PN code in distance measurement should be maintained.

The total number of chips composing the PN code produced by the PN code generator 6 may differ from "31". Preferably, in this case, the upper limit number (the maximum number) of successive chips of "1" in the transmission signal is chosen in consideration of the total number of chips composing the PN code and the anti-noise effect provided by use of the PN code in distance measurement.

Figure 3:
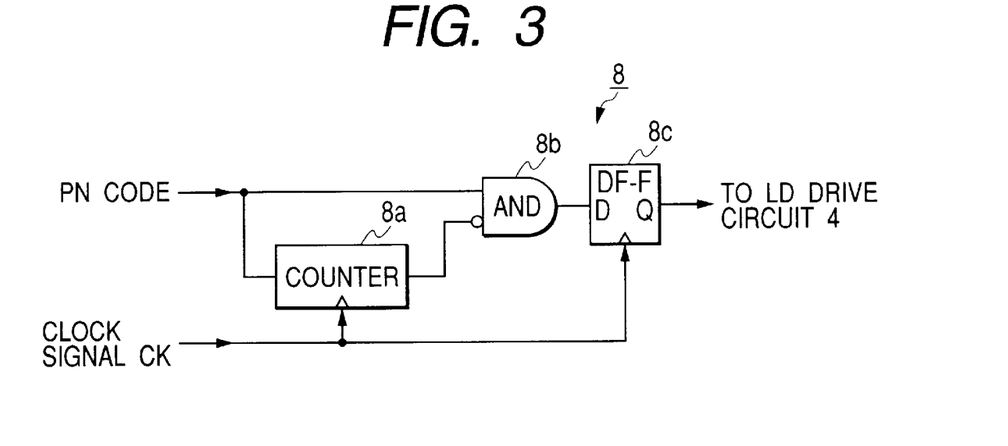
FIG. 3 is a block diagram of the monitor in FIG. 1.
Figure 4:
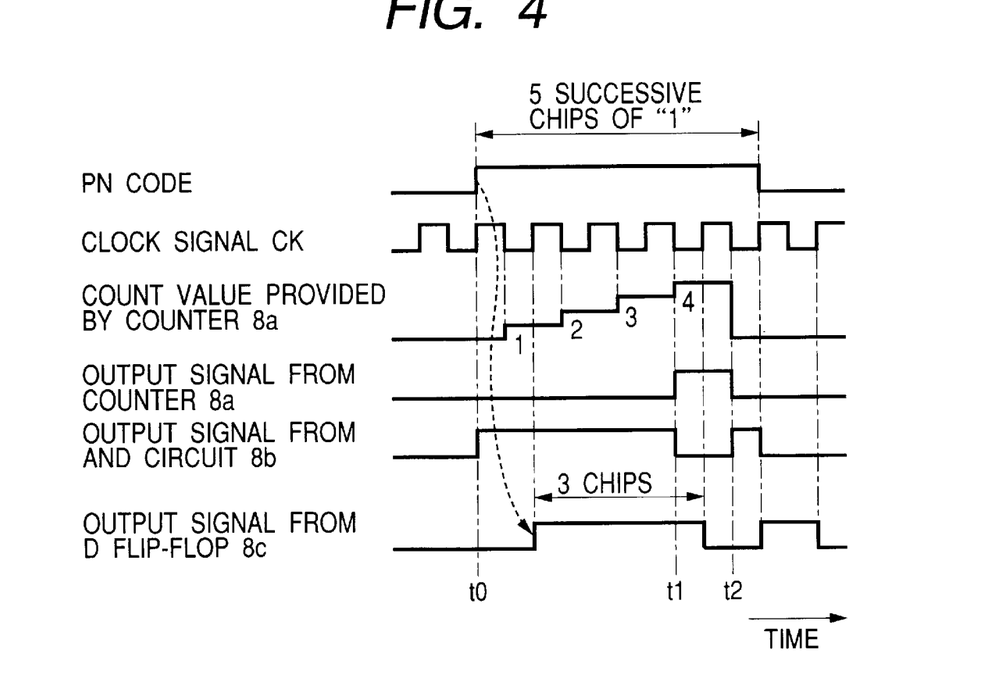
FIG. 4 is a time-domain diagram of signals in the monitor of FIG. 3.

As shown in FIG. 3, the monitor 8 in the transmission-signal generating portion 10 includes a counter 8a, an AND circuit 8b, and a D flip-flop 8c. The counter 8a receives the PN code from the PN code generator 6 in the transmission-signal generating portion 10. The PN code generator 6 is designed so that the PN code produced thereby can change its logic state at a timing of a rising edge in the operation clock signal CK as shown in FIG. 4. The counter 8a operates at a timing of every falling edge in the operation clock signal CK. The low-level state of the PN code resets the counter 8a. Specifically, the low-level state of the PN code resets the count value provided by the counter 8a to "0". As shown in FIG. 4, at a timing of every falling edge in the operation clock signal CK, the counter 8a increments the count value by "1" provided that the PN code is in its high-level state. In the case where the count value provided by the counter 8a reaches "4" at a timing t1 of a certain falling edge in the operation clock signal CK, the counter 8a changes its output signal from a low-level state to a high-level state at the timing t1 and then holds its output signal in the high-level state until a timing t2 of a next falling edge in the operation clock signal CK. At the timing t2, the counter 8a returns its output signal to the low-level state and resets the count value to "0" on a self resetting basis. The output signal from the counter 8a is in the low-level state when the count value is "0", "1", "2", or "3". The output signal from the counter 8a propagates to a first input terminal of the AND circuit 8b through an inverter (no reference character). A second input terminal of the AND circuit 8b receives the PN code from the PN code generator 6 in the transmission-signal generating portion 10.

When the output signal from the counter 8a is in the low-level state, the PN code propagates through the AND circuit 8b and reaches the D flip-flop 8c as it is. On the other hand, when the output signal from the counter 8a is in the high-level state, the AND circuit 8b outputs a low-level signal to the D flip-flop 8c regardless of the logic state of the logic state of the PN code. Thus, in the case where the output signal from the counter 8a is in the high-level state while the PN code is in the high-level state, the AND circuit 8b inverts the PN code to its low-level state and the inversion-resultant PN code propagates to the D flip-flop 8c. With reference to FIG. 4, a succession of five chips of "1" in the PN code starts at a moment t0. The succession of five chips of "1" is processed by the AND circuit 8b as follows. At a timing t1 of a falling edge in the operation clock signal CK during the duration of fourth one of five successive chips of "1" in the PN code, the count value provided by the counter 8a increments to "4" and hence the output signal of the counter 8a changes from the low-level state to the high-level state. The counter 8a holds its output signal in the high-level state until a timing t2 of a falling edge in the operation clock signal CK during the duration of fifth one of five successive chips of "1" in the PN code. At the timing t2, the counter 8a returns its output signal to the low-level state so that the output signal from the AND circuit 8b is equalized in logic state to the PN code. Accordingly, the output signal of the counter 8a remains in the high-level state during the time interval between the moments t1 and t2. As previously mentioned, when the output signal from the counter 8a is in the high-level state, the AND circuit 8b inverts the PN code to its low-level state. The inversion-resultant PN code propagates to the D flip-flop 8c.

The D flip-flop 8c latches the output signal from the AND circuit 8b at a timing of every rising edge in the operation clock signal CK. The D flip-flop 8c outputs the latching-resultant binary signal to the laser-diode drive circuit 4 as the transmission signal. The D flip-flop 8c delays the transmission signal relative to the PN code by one period of the operation clock signal CK. The previously-mentioned inverting operation of the AND circuit 8b limits the number of successive chips of "1" in the transmission signal to three or less (see FIG. 4). Among five successive chips of "1" in the PN code, only a fourth chip is inverted to "0" as shown in FIG. 4. The transmission signal outputted from the D flip-flop 8c reflects the inversion of the fourth chip to "0".

The monitor 8 in FIG. 3 has a relatively simple structure. The simple structure of the monitor 8 is advantageous in reducing the cost of the distance measurement apparatus.

The transmission-signal generating portion 10 which includes the PN code generator 6 and the monitor 8 may be formed by the microcomputer 20. In this case, the program for the microcomputer 20 has an additional segment designed to implement steps corresponding to the function of the transmission-signal generating portion 10.

Second Embodiment

Figure 5:
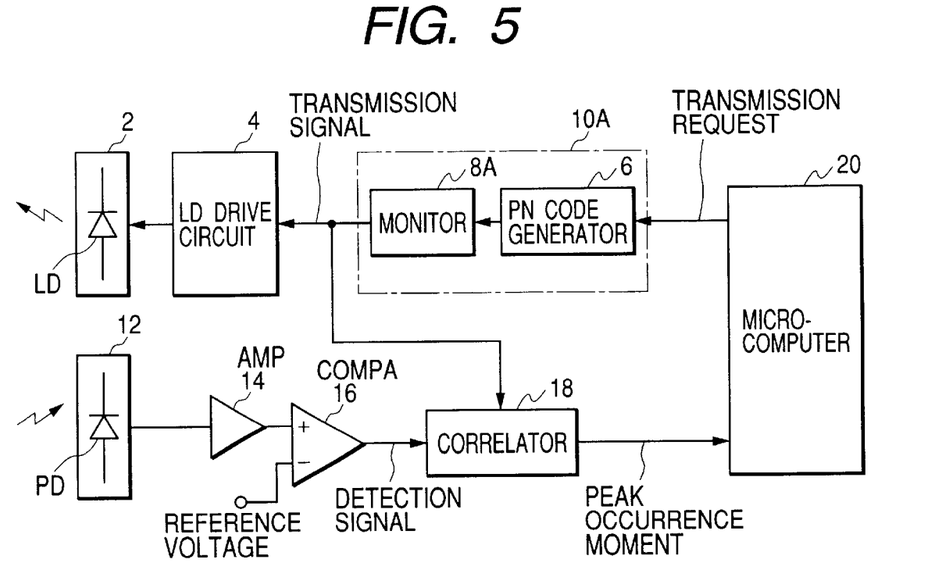
FIG. 5 is a block diagram of a distance measurement apparatus according to a second embodiment of this invention.

FIG. 5 shows a distance measurement apparatus according to a second embodiment of this invention. The apparatus of FIG. 5 is similar to the apparatus of FIG. 1 except that a transmission-signal generating portion 10A replaces the transmission-signal generating portion 10. The transmission-signal generating portion 10A includes a monitor 8A instead of the monitor 8 (see FIGS. 1 and 3). The monitor 8A is modified from the monitor 8. The monitor 8A is designed to limit not only the number of successive chips of "1" in a PN code but also the number of successive chips of "0" therein. The transmission-signal generating portion 10A includes the PN code generator 6 which is the same as that in the transmission-signal generating portion 10.

Figure 6:
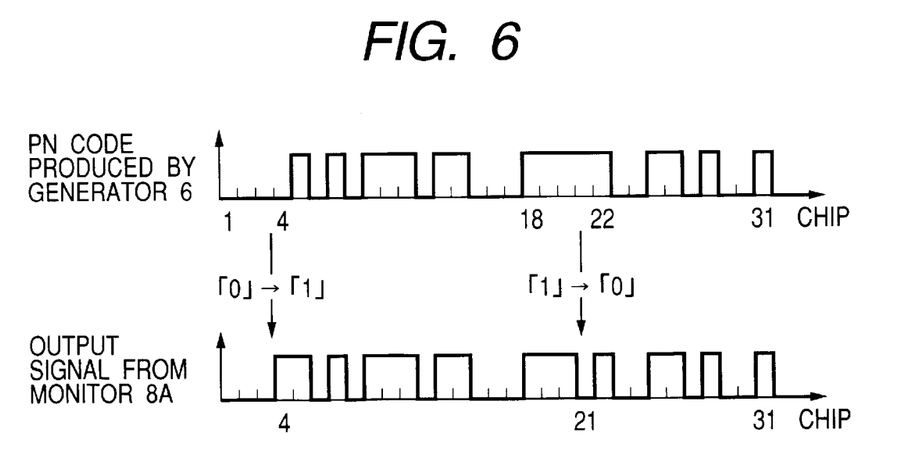
FIG. 6 is a diagram of an example of the states of chips composing an output signal of a PN code generator in FIG. 5, and an example of the states of chips composing an output signal of a monitor in FIG. 5.

Similarly to the monitor 8, the monitor 8A detects at least four successive chips of "1" in the PN code generated by the PN code generator 6. As shown in FIG. 6, the monitor 8A inverts last one among four successive chips of "1" in the PN code to "0" (a low level). Also, the monitor 8A detects at least four successive chips of "0" in the PN code. As shown in FIG. 6, the monitor 8A inverts last one among four successive chips of "0" in the PN code to "1" (a high level). The monitor 8A outputs the inversion-resultant PN code to the laser-diode drive circuit 4 as the transmission signal.

Figure 7:
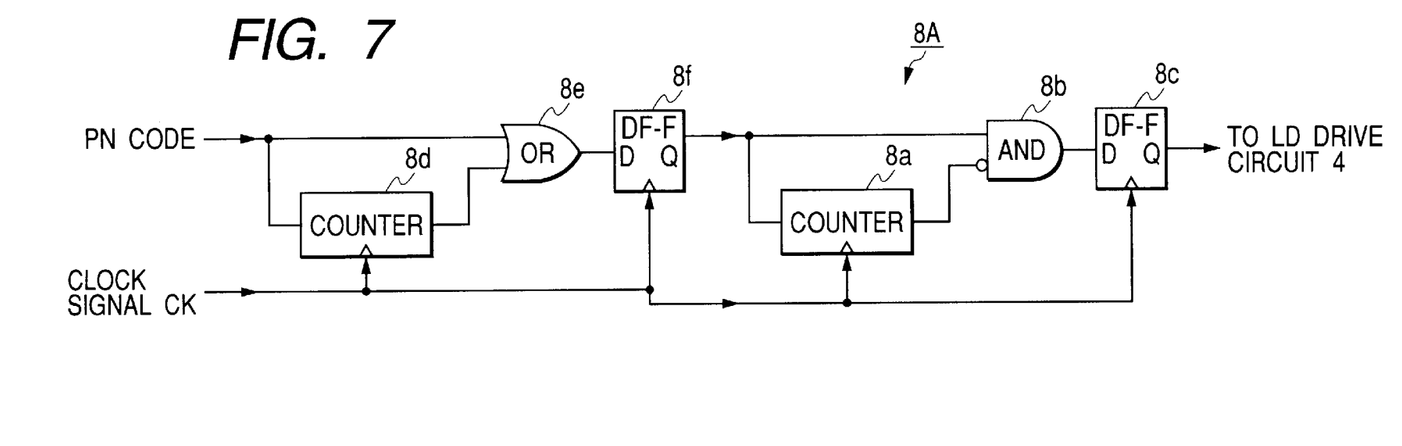
FIG. 7 is a block diagram of a first example of the monitor in FIG. 5.
Figure 8:
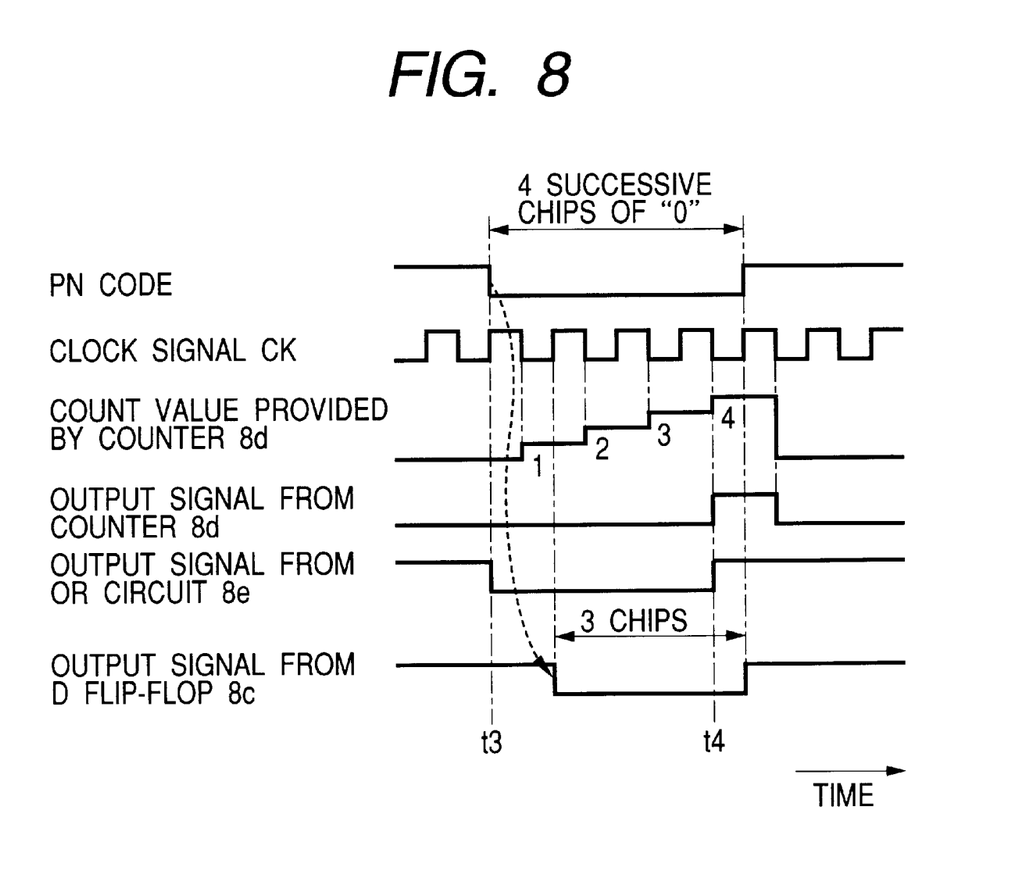
FIG. 8 is a time-domain diagram of signals in the monitor of FIG. 5.

FIG. 7 shows a first example of the monitor 8A in the transmission-signal generating portion 10A. The monitor 8A in FIG. 7 includes a counter 8d, an OR circuit 8e, and a D flip-flop 8f in addition to the counter 8a, the AND circuit 8b, and the D flip-flop 8c. The counter 8a, the AND circuit 8b, and the D flip-flop 8c are the same as those in FIG. 3. The counter 8d receives an inversion of the PN code generated by the PN code generator 6 in the transmission-signal generating portion 10A. As shown in FIG. 8, the counter 8d operates at a timing of every falling edge in the operation clock signal CK. The high-level state of the PN code resets the counter 8d. Specifically, the high-level state of the PN code resets the count value provided by the counter 8d to "0". As shown in FIG. 8, at a timing of every falling edge in the operation clock signal CK, the counter 8d increments the count value by "1" provided that the PN code is in its low-level state. In the case where the count value provided by the counter 8d reaches "4" at a timing t4 of a certain falling edge in the operation clock signal CK, the counter 8d changes its output signal from a low-level state to a high-level state at the timing t4 and then holds its output signal in the high-level state until a timing t5 of a next falling edge in the operation clock signal CK. At the timing t5, the counter 8d returns its output signal to the low-level state and resets the count value to "0". The output signal from the counter 8d is in the low-level state when the count value is "0", "1", "2", or "3". The output signal from the counter 8d propagates to a first input terminal of the OR circuit 8e. A second input terminal of the OR circuit 8e receives the PN code from the PN code generator 6 in the transmission-signal generating portion 10A.

When the output signal from the counter 8d is in the low-level state, the PN code propagates through the OR circuit 8e and reaches the D flip-flop 8f as it is. On the other hand, when the output signal from the counter 8d is in the high-level state, the OR circuit 8e outputs a high-level signal to the D flip-flop 8f regardless of the logic state of the PN code. Thus, in the case where the PN code is in the low-level state while the output signal from the counter 8d is in the high-level state, the OR circuit 8e inverts the PN code to its high-level state and the inversion-resultant PN code propagates to the D flip-flop 8f. With reference to FIG. 8, a succession of four chips of "0" in the PN code starts at a moment t3. The succession of four chips of "0" is processed by the OR circuit 8e as follows. At a timing t4 of a failing edge in the operation clock signal CK during the duration of final one of four successive chips of "0" in the PN code, the count value provided by the counter 8d increments to "4" and hence the output signal of the counter 8d changes from the low-level state to the high-level state. Thus, at the timing t4, the output signal of the OR circuit 8e changes from the low-level state to the high-level state although the PN code is in the low-level state. The counter 8d holds its output signal in the high-level state until a timing t5 of a next falling edge in the operation clock signal CK. Therefore, during the time interval between the moments t4 and t5, the output signal of the OR circuit 8e remains in the high-level state. The duration of final one of four successive chips of "0" terminates and the PN code returns from the low-level state to the high-level state at the moment of a rising edge in the operation clock signal CK during the time interval between the moments t4 and t5. At the timing t5, the counter 8d returns its output signal to the low-level state so that the output signal from the OR circuit 8e is equalized in logic state to the PN code. As previously mentioned, when the PN code is in the low-level state and the output signal from the counter 8a is in the high-level signal, the OR circuit 8e inverts the PN code to its high-level state. The inversion-resultant PN code propagates to the D flip-flop 8f.

The D flip-flop 8f latches the output signal from the OR circuit 8e at a timing of every rising edge in the operation clock signal CK. The D flip-flop 8f outputs the latching-resultant binary signal to the counter 8a and the AND circuit 8b. The D flip-flop 8f delays the latching-resultant binary signal relative to the PN code by one period of the operation clock signal CK. The previously-mentioned inverting operation of the OR circuit 8e limits the number of successive chips of "0" in the output signal of the D flip-flop 8f to three or less (see FIG. 8). Among four successive chips of "0" in the PN code, only a fourth chip is inverted to "1" as shown in FIG. 8. The output signal of the D flip-flop 8f reflects the inversion of the fourth chip to "1".

The counter 8a, the AND circuit 8b, and the D flip-flop 8c cooperate to convert the output signal of the D flip-flop 8f into the transmission signal. The transmission signal is fed from the D flip-flop 8c to the laser-diode drive circuit 4. Specifically, the counter 8a detects at least four successive chips of "1" in the output signal of the D flip-flop 8f. The AND circuit 8b inverts last one among four successive chips of "1" in the output signal of the D flip-flop 8f "0" (a low level) in response to the output signal from the counter 8a. The inversion-resultant signal propagates from the AND circuit 8b to the D flip-flop 8c. The D flip-flop 8c periodically latches the inversion-resultant signal in response to the operation clock signal CK, thereby converting the inversion-resultant signal into the transmission signal. The D flip-flop 8c outputs the transmission signal to the laser-diode drive circuit 4. The D flip-flops 8c and 8f delay the transmission signal relative to the PN code by two periods of the operation clock signal CK.

As previously mentioned, the number of successive chips of "1" in the transmission signal is limited to three or less. Also, the number of successive chips of "0" in the transmission signal is limited to three or less. The limitation on the number of successive chips of "1" and the limitation on the number of successive chips of "0" suppress extension of the frequency spectrum of the transmission signal, that is, the frequency spectrum of the echo signal outputted from the light receiving portion 12, into a lower frequency side. Therefore, a low-frequency fluctuation in the echo signal is also suppressed, and hence the echo signal is more accurately converted into the binary detection signal by the comparator 16.

Figure 9:
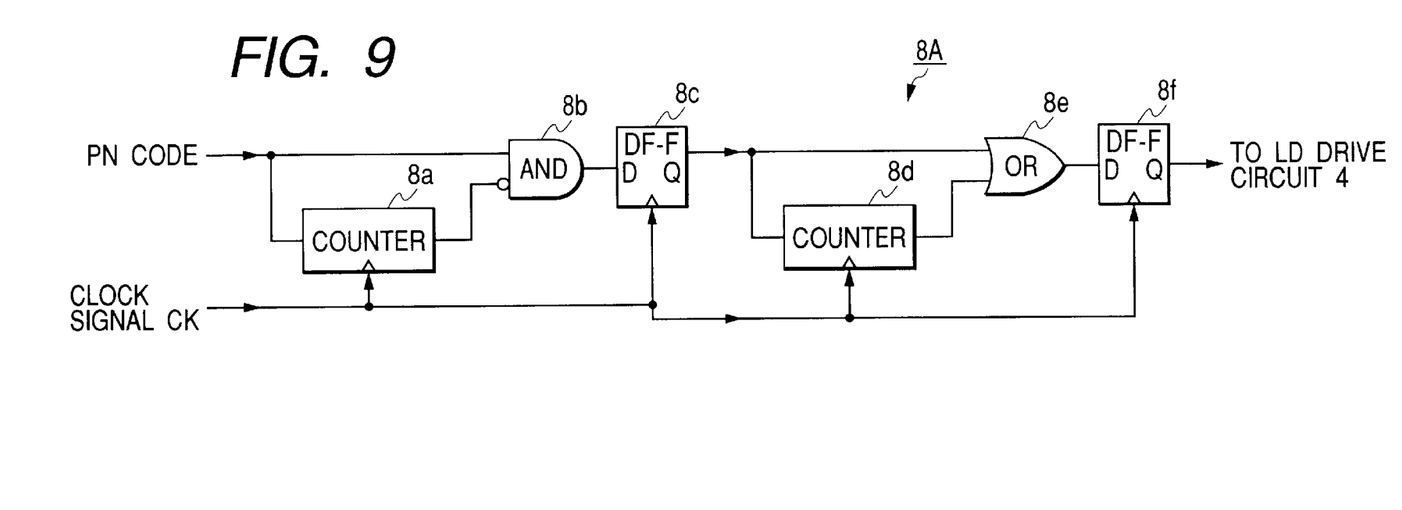
FIG. 9 is a block diagram of a second example of the monitor in FIG. 5.

FIG. 9 shows a second example of the monitor 8A. The monitor 8A in FIG. 9 includes a counter 8d, an OR circuit 8e, and a D flip-flop 8f in addition to the counter 8a, the AND circuit 8b, and the D flip-flop 8c. The counter 8a, the AND circuit 8b, and the D flip-flop 8c are the same as those in FIG. 3. The counter 8a and the AND circuit 8b receive the PN code from the PN code generator 6 in the transmission-signal generating portion 10A. The counter 8d, the OR circuit 8e, and the D flip-flop 8f are the same as those in FIG. 7. The counter 8d receives an inversion of the output signal of the D flip-flop 8c. The OR circuit 8e receives the output signal of the D flip-flop 8c. The D flip-flop 8f outputs the transmission signal to the laser-diode drive circuit 4. The monitor 8A in FIG. 9 operates similarly to that in FIG. 7.

Third Embodiment

A third embodiment of this invention is similar to the first or second embodiment thereof except that the PN code generated by the PN code generator 6 is a maximum length code having a chip number different from "31". The PN code may be of a type differing from the maximum length type.

Fourth Embodiment

A fourth embodiment of this invention is similar to the first or second embodiment thereof except that a correlation between an analog received signal or a multi-value received signal and a reference signal is calculated.

Fifth Embodiment

A fifth embodiment of this invention is similar to the first or second embodiment thereof except that the laser light is replaced by other electromagnetic wave such as radio wave or millimeter wave.

What is claimed is:

1. A distance measurement apparatus comprising:
   electromagnetic wave generating means for generating and transmitting an electromagnetic wave;
   code generating means for generating a pseudo random noise code having a sequence of a predetermined number of chips each being in one of first and second logic states different from one another;
   code monitoring means for detecting at least a preset number of successive chips in the first logic state in the pseudo random noise code generated by the code generating means, and for changing at least one among the detected preset number of successive chips to the second logic state to convert the pseudo random noise code into a transmission signal;
   driving means for activating and deactivating the electromagnetic wave generating means to modulate the electromagnetic wave in response to the transmission signal generated by the code monitoring means;
   receiving means for receiving an echo wave caused by reflection of the electromagnetic wave generated by the electromagnetic wave generating means and modulated by the driving means at an object, and for converting the received echo wave into a received signal;
   correlation calculating means for calculating a correlation between the received signal generated by the receiving means and the transmission signal used by the driving means; and
   distance calculating means for detecting a moment at which the correlation calculated by the correlation calculating means peaks, and for calculating a distance to the object from the detected moment.

2. A distance measurement apparatus as recited in claim 1, wherein the electromagnetic wave generating means includes a light emitting element, and the driving means activates the light emitting element to allow generation of light when the transmission signal assumes a logic state corresponding to the first logic state, and deactivates the light emitting element to inhibit generation of the light when the transmission signal assumes a logic state corresponding to the second logic state.

3. A distance measurement apparatus as recited in claim 1, wherein the driving means activates the electromagnetic wave generating means to allow generation of the electromagnetic wave when the transmission signal assumes a logic state corresponding to the first logic state, and deactivates the electromagnetic wave generating means to inhibit generation of the electromagnetic wave when the transmission signal assumes a logic state corresponding to the second logic state.

4. A distance measurement apparatus as recited in claim 1, wherein the code monitoring means comprises means for detecting at least a given number of successive chips in the second logic state in the pseudo random noise code generated by the code generating means, and for changing at least one among the detected given number of successive chips to the first logic state to convert the pseudo random noise code into the transmission signal.

5. A distance measurement apparatus comprising:
   first means for generating a first pseudo random noise code having a sequence of chips each being in one of first and second logic states different from one another;
   second means for detecting a preset number of successive chips in the first logic state in the first pseudo random noise code generated by the first means, and for changing last one among the detected preset number of successive chips to the second logic state to convert the first pseudo random noise code into a second pseudo random noise code; and third means for emitting an electromagnetic wave in response to the second pseudo random noise code generated by the second means.

6. A distance measurement apparatus comprising:

first means for generating a first pseudo random noise code having a sequence of chips each being in one of first and second logic states different from one another;

second means for detecting a preset number of successive chips in the first logic state in the first pseudo random noise code generated by the first means, and for changing last one among the detected preset number of successive chips to the second logic state to convert the first pseudo random noise code into a second pseudo random noise code;

third means for detecting a given number of successive chips in the second logic state in the second pseudo random noise code generated by the second means, and for changing last one among the detected given number of successive chips to the first logic state to convert the second pseudo random noise code into a third pseudo random noise code; and fourth means for emitting an electromagnetic wave in response to the third pseudo random noise code generated by the third means.

* * * * *